United States Patent [19]

Hirota et al.

[11] 4,403,710
[45] Sep. 13, 1983

[54] EASILY-OPENABLE HEAT SEAL LID

[75] Inventors: Kazumi Hirota, Tokyo; Yotaro Tsutsumi, Yokohama; Senji Ito, Ayase; Tadahiko Katsura, Yokohama; Kikuo Matsuoka, Yokohama; Ichiro Hori, Yokohama, all of Japan

[73] Assignee: Toyo Seikan Kaisha Ltd., Tokyo, Japan

[21] Appl. No.: 376,949

[22] Filed: May 11, 1982

[30] Foreign Application Priority Data

May 13, 1981 [JP] Japan .................................. 56-70783
Apr. 8, 1982 [JP] Japan .................................. 57-57273
Apr. 22, 1982 [JP] Japan .................................. 57-66373

[51] Int. Cl.³ ............................................. B65D 17/34
[52] U.S. Cl. .................................................... 220/270
[58] Field of Search ............................. 220/269–273, 220/359, 260

[56] References Cited

U.S. PATENT DOCUMENTS 3,187,931 6/1965 Henchert ........................... 220/270
3,339,788 9/1967 Lipske ................................ 220/270
3,735,893 5/1973 Gayner et al. ..................... 220/270
4,108,330 8/1978 Patterson ........................... 220/260

Primary Examiner—George T. Hall
Attorney, Agent, or Firm—Sherman & Shalloway

[57] ABSTRACT

Disclosed is an easily openable heat seal lid for sealing a vessel proper by forming a heat-sealed portion between the lid and the vessel proper, which comprises a laminate comprising at least an inner face member composed of a thermoplastic resin and a metal foil, wherein scores defining a portion to be opened are formed on the side inner than the portion to be heat-sealed so that the scores extend to the midway of the thickness direction of the metal foil, and said inner face member comprises at least one heat-sealable thermoplastic resin layer having an adhesion strength of at least 800 g/15 mm to the metal foil, a tear strength lower than 3.0 kg and a tensile modulus of at least 300 kg/cm². In this heat seal lid, the resin layer can be broken sharply along the scores and opening can be accomplished very easily.

12 Claims, 8 Drawing Figures

EASILY-OPENABLE HEAT SEAL LID

BACKGROUND OF THE INVENTION

(1) Field of the Invention

The present invention relates to an easily-openable heat seal lid. More particularly, the present invention relates to a heat seal lid which provides a heat seal having a high heat seal strength between a vessel proper and the lid and can resist sterilizing conditions, for example, retort-sterilizing conditions, and which can easily be opened by breaking the lid along a score line formed thereon.

(2) Description of the Prior Art

A heat seal lid having a sealing capacity and an easy-open property, for example, a so-called peelable seal lid, is known. This peelable seal lid comprises a flexible substrate such as a metal foil and a heat-sealant layer formed on the substrate. A composition formed by incorporating a wax, a tackifier and an elastomer into an olefin resin such as polyolefin, in which the seal strength is adjusted to about 1 Kg/15 mm, is ordinarily used as the heat sealant. A peelable seal lid of this type is defective in that when the content is packed and heat sterilization is carried out, the seal reliability of the lid is poor. In Official Notice No. 17 of the Welfare Ministry of Japan (enforced on Aug. 1, 1977), it is stipulated that a food vessel which is heat-sealed and subjected to heat sterilization should have a heat seal strength of at least 2.3 Kg/15 mm.

A heat seal lid sealed with such a high seal strength is disadvantageous in that peeling on the heat seal interface is manually impossible and therefore, opening is performed by a tool such as a knife or a can opener.

As the lid that can easily be opened manually without using any instrument, there is known a so-called easy-open can lid. In this can lid, an opening portion is defined by scores on a lid formed of an aluminum sheet, a rivet is formed on the opening portion and a pull ring is secured by this rivet of the opening portion, and this can lid is double-seamed to a flange portion of a can body.

This easy-open can lid can resist heat sterilization under pressure and has an excellent easy-open property. However, this can lid is defective in that a large quantity of expensive metallic aluminum should be used as the material, the processing steps are complicated and troublesome and the cost is considerably higher than that of the above-mentioned flexible heat seal lid.

Moreover, vessels to which this easy-open lid can be applied are limited to those having a high heat resistance, for example, cans. For example, when this easy-open lid is double-seamed to a plastic cup-like vessel formed by drawing, it is impossible to form a seal having a high reliability, and when the cup-like vessel is subjected to hot packing or retort sterilization, since the flange of the cup is softened at high temperatures adopted for such treatment, formation of a reliable seal becomes more difficult.

SUMMARY OF THE INVENTION

It is therefore a primary object of the present invention to provide an easily-openable heat seal lid which provides a seal portion having a high heat seal strength and can be subjected to a sterilization treatment such as retort sterilization.

Another object of the present invention is to provide an easily-openable heat seal lid in which at the time of opening, a laminate sheet can be broken smoothly and beautifully along a predetermined opening line.

Still another object of the present invention is to provide an easily-openable heat seal lid which is preferably used for vessels to which double seaming is difficult, for example, plastic vessels, aluminum foil vessels and paper-plastics-aluminum foil laminated vessels.

A further object of the present invention is to provide an easily-openable heat seal lid in which the amount used of an expensive metal material is reduced, the lid-forming operation is simplified and the manufacturing cost can be controlled to a relatively low level.

In accordance with the present invention, there is provided an easily-openable heat seal lid for sealing a vessel proper by forming a heat-sealed portion between the lid and the vessel proper, which comprises a laminate comprising at least an inner face member composed of a thermoplastic resin and a metal foil, wherein scores defining a portion to be opened are formed on the side inner than the portion to be heat-sealed so that the scores extend to the midway of the thickness direction of the metal foil, and said inner face member comprises at least one heat-sealable thermoplastic resin layer having an adhesion strength of at least 800 g/15 mm to the metal foil, a tear strength lower than 3.0 Kg and a tensile modulus of at least 300 Kg/cm$^2$.

The present invention will now be described in detail with reference to embodiments illustrated in the accompanying drawings.

In the drawings, reference numeral 1 represents a heat seal lid and reference numeral 1' represents another heat seal lid. Reference numerals 2 and 3 represent an inner face member composed of a thermoplastic resin and a metal foil, respectively, and reference numerals 6 and 6' represent a depress-tear top end and a grip portion, respectively. Reference numerals 7, 8, 9, 10, 11, 12, 13, 14, 15, 16, 17 and 18 represent a score, an opening tab, an adhesive layer, a heat-sealable adhesive layer, a resin protecting layer, a vessel proper, a flange or curl portion, a paper substrate, an aluminum foil, a polyolefin layer, an inner face member composed of a polyolefin and an outer face member composed of a polyolefin, respectively.

DETAILED DESCRIPTION OF THE PREFERRED EMBODIMENTS

Figure 1:
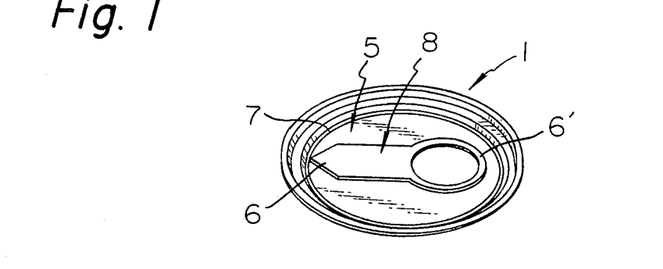
FIG. 1 is a perspective view illustrating one embodiment of the heat seal lid according to the present invention.
Figure 2:
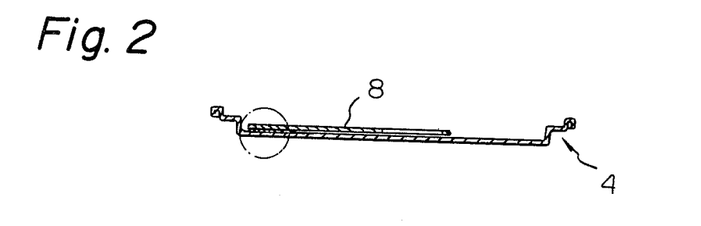
FIG. 2 is a sectional view of the heat seal lid shown in FIG. 1.
Figure 3:
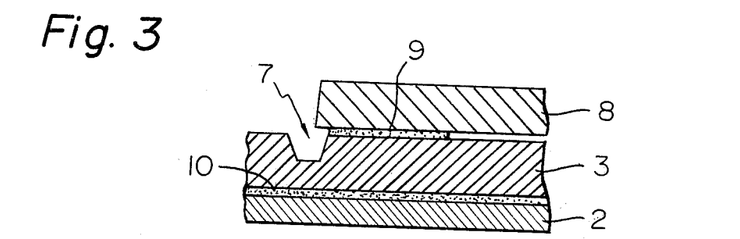
FIG. 3 is an enlarged partial sectional view of the heat seal lid shown in FIG. 1.

As shown in FIGS. 1, 2 and 3, a heat seal lid 1 according to the present invention comprises a laminate comprising at least an inner face member 2 composed of a thermoplastic resin and a metal foil 3. As shown in detail in FIG. 3, scores 7 defining a portion 5 to be opened are formed on the side inner than a portion 4 to be heat-sealed, so that the scores 7 extend to the midway of the thickness direction of the metal foil 3. An opening tab 8 having a depress-tear top end 6 on one end and a grip portion 6' on the other end is bonded to the outer face of the heat seal lid through an adhesive layer 9 at such a positional relation that the depress-tear top end 6 is substantially in agreement with the a score 7.

In the present invention, a resin having specific properties described below is used for the inner face member for heat sealing, and this inner face member 2 is heat-fusion-bonded to the metal foil 3. This inner face member 2 may be either a single layer or a laminate with a layer 10 having a heat bondability to a metal.

It is one of important features of the present invention that for the inner face member 2 for heat sealing or both the inner face member 2 and the layer 10, a heat-sealable thermoplastic resin film having an adhesion strength at least 800 g/15 mm, especially at least 1000 g/15 mm, to the metal foil, a tear strength lower than 3.0 Kg, especially 0.005 to 2.0 Kg, and a tensile modulus of at least 300 Kg/cm$^2$, especially 1000 to 50000 Kg/cm$^2$, is especially selected and used.

The present invention has been completed based on the fundamental finding that in order to tear a laminate of a resin film and a metal foil precisely and smoothly along scores formed on the metal foil, it is necessary that a combination of certain specific properties should be given to the heat-sealable resin film to be used.

Polyethylene, especially low density polyethylene, has been used as the heat-sealable resin most popularly. When a laminate formed by bonding a polyethylene film to a metal foil through a most commonly used adhesive, that is, an isocyanate type adhesive, is torn in a certain direction along scores, the polyethylene film protrudes the torn edge of the metal foil. Namely, it is very difficult to sharply tear the low density polyethylene film along scores, and an easy-open effect cannot be attained. It is believed that this is due to the fact that delamination, that is, interlaminar peeling, is readily caused when the laminate is torn and the polyethylene film or the isocyanate adhesive is excessively elongated on tearing.

In the present invention, the requirement that delamination should be prevented between the metal foil and resin film when the laminate is torn along the scores and the laminate should be torn along the scores is satisfied by using a heat-sealable resin having an adhesion strength of at least 800 g/15 mm, especially at least 1000 g/15 mm, to the metal foil. Furthermore, the heat-sealable resin film that is used in the present invention should satisfy two seemingly contradictory requirements, that is, a tear strength lower than 3.0 Kg and a tensile modulus of at least 300 Kg/cm$^2$. The lower is the tear strength of the film, more easily torn is the film. However, whether or not the film is torn beautifully is influenced by the tensile modulus, and it has been found that as the tensile modulus of the film is higher, the film is torn more beautifully. For example, in case of a resin film having a high rubbery elasticity, even if the tear strength per se is low, the resin is elongated greatly while the resin is being torn, and hence, tearing becomes rather difficult. In contrast, in case of a resin film having a high tensile modulus, while the resin is being torn, the elongation of the resin film is controlled to a low level, and hence, tearing is advanced rather easily.

In case of a resin film having an adhesion strength lower than the above critical value to the metal foil, when the laminate is broken along the score line, delamination is caused between the resin film and the metal foil, and hence, opening by sharp shearing along the score line becomes difficult. If the tensile modulus of the resin film is lower than the above critical value, the above trouble similarly takes place. Furthermore, if the tear strength of the resin film is higher than the above critical value, the manual opening operation becomes difficult.

The heat-sealable resin that is preferably used for attaining the objects of the present invention is one that can be heat-bonded to a metal foil, and a thermoplastic resin containing carbonyl groups derived from a carboxylic acid, an acid anhydride, a carboxylic acid salt, an ester, an amide, a urea compound or a urethane compound at a concentration of 1 to 1400, especially 10 to 500, milliequivalents (meq) per 100 g of the polymer, which has the above-mentioned physical properties, is advantageously used in the present invention.

Such heat-sealable, carbonyl group-containing thermoplastic resins include various homopolyesters, copolyesters, homopolyamides, copolyamides, copolycarbonates and copolymers of olefins with carbonyl group-containing monomers. For example, there can be used polymers described below, so far as they have the above-mentioned physical properties.

(a) Polyesters comprising recurring units represented by the following general formula:

(1)

or (2)

wherein $R_1$ stands for an alkylene group having 2 to 6 carbon atoms and $R_2$ stands for an alkylene or arylene group having 2 to 24 carbon atoms.

For example, there can be mentioned homopolyesters comprising one dibasic acid component selected from terephthalic acid, isophthalic acid, adipic acid, sebacic acid, maleic acid and fumaric acid and at glycol component selected from ethylene glycol, tetramethylene glycol, propylene glycol, diethylene glycol and triethylene glycol, and copolyesters comprising a plurality of monomers as one or both of the dibasic acid and glycol components. High-molecular-weight copolyesters comprising terephthalic acid units and other dibasic acid units as the dibasic acid component and tetramethylene glycol units as the diol component and high-molecular- weight copolyesters comprising benzene-dicarboxylic acid units as the dibasic acid component and tetramethylene glycol units and other diol units are especially preferred. As such high-molecular-weight copolyester, there can be mentioned polytetramethylene terephthalate/isophthalate, polytetramethylene terephthalate/isophthalate/adipate, polytetramethylene terephthalate/sebacate, polytetramethylene/ethylene terephthalate, polytetramethylene/polyoxyethylene terephthalate and polytetramethylene/polyoxyethylene terephthalate/isophthalate.

These copolyesters may be used singly or in the form of a blend of two or more of them. Furthermore, these copolyesters may be used in the form of a blend with a polyolefin type resin such as polyethylene, polypropylene, an ionomer, an ethylene-vinyl acetate copolymer or modified polypropylene.

(b) Polyamides having recurring units represented by the following general formula:

or wherein n is a number of from 3 to 13 and n is a number of from 4 to 11.

For example, there can be mentioned, poly-$\omega$-aminocaproic acid, poly-$\omega$-aminoheptanoic acid, poly-$\omega$-aminocaprylic acid, poly-$\omega$-aminopelargonic acid, poly-$\omega$-aminodecanoic acid, poly-$\omega$-aminoundecanoic acid, poly-$\omega$-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydodecamethylene azelamide and polytridecamethylene azelamide.

These polyamides may be used in the form of a mixture of two or more of them. Moreover, copolyamides comprising two or more of monomers or blends of these copolyamides may be used. Incidentally, the polyamide to be used may be modified with a small amount of a foreign component such as dimer acid.

(c) Polycarbonates having recurring units represented by the following formula:

wherein $R_3$ represents a hydrocarbon group having 8 to 15 carbon atoms, and copolycarbonates with an aliphatic or aromatic dihydroxy compound.

For example, there can be mentioned poly-p-xylene glycol biscarbonate, poly-dihydroxydiphenylmethane carbonate, polydihydroxydiphenylethane carbonate, poly-dihydroxydiphenyl-2,2-propane carbonate and poly-dihydroxydiphenyl-1,1-ethane carbonate.

(d) Furthermore, there may be used acid-modified polyolefins obtained by graft-polymerizing an ethylenically unsaturated carboxylic acid such as acrylic acid, methacrylic acid or crotonic acid or an ethylenically unsaturated carboxylic acid anhydride such as maleic anhydride or itaconic anhydride to a polyolefine such as polyethylene, polypropylene or a crystalline ethylene-propylene copolymer, copolymers of a vinyl ester with an olefin or other vinyl monomer and partial saponification products thereof such as an ethylene/vinyl acetate copolymer and a partially saponified ethylene/vinyl acetate copolymer, ionomer resins obtained by neutralizing copolymers of an olefin with an unsaturated carboxylic acid optionally with other vinyl monomer by an alkali metal, an alkaline earth metal or an organic base, such as Surlyns supplied by Du Pont Co., U.S.A., and resins obtained by oxidizing polyethylene, polypropylene or a crystalline ethylene/propylene copolymer with oxygen, ozone or other oxidant.

Of course, these resins should satisfy the abovementioned requirements of the physical properties.

It is preferred that the thickness of the inner face member film be 5 to 100 microns, especially 10 to 70 microns. If the thickness is too large and exceeds the above range, shearing along the scores often becomes difficult, and if the thickness is too small and is below the above range, the heat-sealing property tends to decrease.

Ordinarily, this inner face member film may have a single-layer structure. However, the film may have a multi-layer structure if desired. For example, there may be used a multi-layer inner face member comprising a layer especially excellent in the adhesion to the metal foil on the side contiguous to the metal foil and a layer excellent in the heat sealability, especially the low-temperature heat sealability and the adaptability to the heat-sealing operation, which is formed on the layer excellent in the adhesion to the metal foil. Of course, when a multi-layer inner face member is used, it is indispensable that the respective layer should satisfy the foregoing requirements of the physical properties.

This multi-layer film can easily be obtained by co-extruding a plurality of resins through a multi-ply die and forming the extrudate into a film.

If a multi-layer film such as mentioned above is used as the inner face member, even a heat-sealable resin having no bondability to the metal foil can be used as a part of the inner face member.

As a typical instance of this multi-layer structure, there can be mentioned a structure comprising (a) a layer composed of a crystalline olefin resin formed mainly of propylene or a crystalline olefin resin having a melt index of 1 to 40 g/10 min and (b) an acid- or acid anhydride-modified olefin resin in which the main constituent monomer is the same as that of the resin of the layer (a). An inner face member having this multi-layer structure is applied so that the layer (b) is contiguous to the metal foil.

The propylene resin used in this preferred embodiment has such a characteristic chemical structure that in the polymer chain, tertiary carbon atoms appear alternately, and because of this characteristic, the propylene resin is subject to thermal degradation. This propylene resin is further characterized in that crystallization is readily advanced at high temperatures.

If a film of this propylene resin is fusion-bonded to a metal foil through the acid-modified propylene resin layer, since the acid-modified propylene resin contains a carboxyl group having a high affinity with the metal foil and the main constituent olefin units of the acid-modified propylene resin are the same as those of the propylene resin, a strong interlaminar bonding that can resist retort sterilization or tearing can be obtained. Furthermore, the elongation of the film is controlled by the thermal degradation or crystallization of the propylene resin caused at the fusion-bonding step. Therefore, precise and smooth tearing along the scores becomes possible.

An isotactic polypropylene is especially preferred as the propylene resin. However, a crystalline propylene-/ethylene copolymer having an ethylene content of up to 15 mole %, especially up to 10 mole %, can also be used as the propylene resin. It is ordinarily preferred that the propylene resin should have a melt index (ASTM D-1238) of 1 to 100 g/10 min, especially 5 to 100 g/10 min. If the thickness of the film of the propylene resin is too large, tearing of the laminate along the scores becomes difficult, and if the thickness is too small, the heat sealability is reduced. Accordingly, it is preferred that the thickness of the film of the propylene resin be 30 to 150μ, especially 50 to 100μ.

In accordance with another preferred embodiment of the present invention, an ethylene resin having a melt index (ASTM D-1238) of 1 to 40 g/10 min, especially 2 to 30 g/10 min, is selected and is heat-bonded to an aluminum foil through a layer of an acid- or acid anhydride-modified ethylene resin. In this embodiment, when the metal foil is broken along scores, also this film layer is sharply torn along the scores. Accordingly, an excellent easy-open property can be attained, and the appearance of the opened portion is very good.

If the melt index of the ethylene resin is smaller than 1 g/10 min, the toughness or elongation of the inner face member becomes too high, and it becomes difficult to break the inner face member film precisely along the scores in the scored portion of the metal foil. If the melt index of the ethylene resin is larger than 40 g/10 min, since scores are formed on the metal foil, the mechanical strength of the lid per se is reduced and moreover, formation of a film of this ethylene resin is difficult.

As the ethylene resin, there can be used medium-density polyethylene, high-density polyethylene, an ethylene-rich crystalline ethylene/propylene copolymer and a crystalline ethylene/butene-1 copolymer. Polyethylene having a density higher than 0.945 g/cc, especially high-density polyethylene, is suitable for attaining the objects of the present invention.

When an ethylene resin and an acid-modified ethylene resin are used in combination according to this preferred embodiment, it is preferred that the total thickness of both the layers be up to 70 microns, especially 30 to 50 microns.

As the acid-modified olefin resin, there may be used a product obtained by graft-modifying an olefin resin with an ethylenically unsaturated carboxylic acid or its anhydride. If the inner face member is composed of a propylene resin, an acid-modified olefin resin comprising a propylene resin as the trunk polymer is used, and if the inner face member is composed of an ethylene resin, an acid-modified olefin resin comprising an ethylene resin as the trunk polymer is used.

A preferred acid-modified olefin resin contains a carboxyl group or its anhydride at a concentration of 1 to 600 milliequivalents (meq)/100 g of the polymer, especially 10 to 300 meq/100 g of the polymer. In view of the easy-open property and the heat bondability, it is preferred that the modified olefin resin should have a melt index of at least 5 g/10 min.

As the acid or anhydride, the following compounds may be used singly or in combination.

(A) Ethylenically unsaturated carboxylic acids such as acrylic acid, methacrylic acid, maleic acid, fumaric acid, crotonic acid, itaconic acid, citraconic acid and 5-norbornene-2,3-dicarboxylic acid.

(B) Ethylenically unsaturated carboxylic anhydrides such as maleic anhydride, citraconic anhydride, 5-norbornene-2,3-dicarboxylic anhydride and tetrahydrophthalic anhydride.

Maleic anhydride-modified polypropylene and maleic anhydride-modified polyethylene are especially suitable for attaining the objects of the present invention.

The modifying treatment is accomplished by introducing the above-mentioned monomer into the main or side chain of the olefin resin by known means such as graft copolymerization or terminal treatment. For example, a modified olefin resin can easily be obtained by contacting a trunk polymer composed of an olefin resin with an acid group-containing ethylenically unsaturated monomer in the presence of a radical initiator or radical initiating means. The modified olefin resin is interposed in the thickness of 0.5 to 20μ, 1 to 10μ, between the metal foil and the olefin resin layer.

Lamination of the inner face member on the metal foil is accomplished by applying the inner face member film onto the metal foil and subjecting the assembly to a heat treatment to heat-bond the inner face member to the metal foil. This heat bonding is carried out at a temperature higher than the melting or softening point of the resin but lower than the decomposition point thereof. The fusion bonding can easily be accomplished by passing the laminate maintained at the above temperature through between pressing rolls, and the laminate is cooled by passing it through between chill rolls. In the present invention, it is preferred that at this step, cooling of the laminate from the fusion bonding temperature to a temperature lower than the crystallization temperature be performed over a period of at least 2 seconds, especially at least 3 seconds, so that the degree of crystallization of the inner face member resin is increased to a level as high as possible.

For production of an easily-openable heat seal lid provided with an olefin resin inner face member, a film of an olefin resin is heat-fusion-bonded to a metal foil through a modified olefin resin layer. This fusion bonding can be accomplished by various means. For example, there may be adopted a method in which a modified olefin resin is coated in the form of a film, powder, dispersion or solution on a metal foil, the coating is heated to melt the modified olefin resin, and a preformed film of an olefin resin is piled on the melt and is fusion-bonded to the metal foil. Coating of the olefin resin is performed by electrostatic coating, electrophoretic coating, roll coating, dip coating, bar coating, spray coating or fluidized dipping. Furthermore, the co-extrusion coating method can be adopted. Heating of the coated metal foil is accomplished by high frequency induction heating, infrared ray heating or hot air furnace heating.

Instead of the method in which the modified olefin resin and the olefin resin are independently applied to the metal foil, there may be adopted a method in which both the resins are co-extruded through a multi-ply die and the extruded two-layer film is heat-fusion-bonded to the metal film.

In the propylene resin-using embodiment of the present invention, from the viewpoint of the easy-open property, it is preferred that the propylene resin be crystallized or the crystal size be increased. The degree of crystallization of the propylene resin has a close relation to the density of the resin. In a conventional laminate for a retortable pouch, which includes a propylene resin as an inner face material, in view of the strength or heat sealability of the pouch, the fusion-bonded laminate is rapidly cooled to control crystallization. In contrast, according to the present invention, the density of the propylene resin is increased to at least 0.885 g/cc, especially at least 0.890 g/cc by adoption of gradual cooling means described hereinafter, whereby the size of spherulites is increased to at least $5\mu$, especially at least $12\mu$. Incidentally, the size of spherulites can be determined according to the light scattering method.

Fusion bonding of the propylene resin is carried out at a temperature higher than the melting point of the resin but lower than the decomposition temperature of the resin, especially 160° to 260° C. More specifically, the fusion bonding is accomplished by passing the laminate maintained at the above temperature through between press rolls. Then, the laminate is passed through between chill rolls to cool the laminate. Cooling of the laminate from the fusion bonding temperature to a temperature lower than the crystallization temperature is conducted over a period of at least 2 seconds, especially at least 3 seconds.

In the ethylene resin-using embodiment of the present invention, from the viewpoint of the easy-open property, it is important that the above-mentioned ethylene resin layer and acid- or acid anhydride-modified resin layer should be applied to the metal foil so that the total thickness is up to 70 microns, especially 30 to 50 microns. In packages having a heat-sealed structure, from the viewpoint of the heat sealability, the thickness of the film layer is ordinarily adjusted to at least 70 microns. In this embodiment of the present invention, in contrast, the entire thickness of the inner face resin member inclusive of the adhesive layer is controlled to up to 70 microns, whereby it is made possible to break the inner face resin member precisely along scores of the metal foil.

As means for controlling the thickness of the inner face resin member within the above-mentioned range, a method in which a preformed ethylene resin film is bonded to a metal foil through an acid-modified ethylene resin is not advantageous. From the viewpoint of the easiness in controlling the thickness, there is advantageously adopted a co-extrusion coating method in which the ethylene resin and acid-modified resin are co-extruded through a multi-ply die so that both the layers are contiguous to each other and the extrudate is coated on the metal foil.

When an ethylene resin film having a small thickness is easily available, there may be adopted a method in which an acid-modified ethylene resin is applied in the form of a suspension, emulsion or solution on a metal foil, a thin film of an ethylene resin is piled on the acid-modified ethylene resin layer and fusion bonding is then carried out, though this method is interior in the operation efficiency.

Fusion bonding of the ethylene resin is carried out in the same manner as in case of the propylene resin except that the fusion bonding temperature is adjusted to 160° to 220° C.

It is most preferred that in the inner face resin member, the thickness of the ethylene resin layer be 10 to 35 microns and the thickness of the acid-modified ethylene resin be 5 to 10 microns.

In the present invention, a foil of a light metal such as an aluminum foil is preferably used as the metal foil. Of course, other metal foils, such as an iron foil, a steel foil and a tinplate foil may be used. From the viewpoint of the resistance to heat sterilization, it is preferred that the metal foil be subjected to a preliminary treatment such as an alumite treatment, a boehmite treatment, a chemical treatment with phosphoric acid and/or chromic acid or a forming treatment.

The metal foil should have a certain rigidity enough to enable tearing along scores. From this viewpoint, it is preferred that the thickness of the metal foil be at least $50\mu$, especially at least $80\mu$. From the economical viewpoint and in order to prevent hurting of fingers and the like at the time of opening, it is preferred that the thickness of the metal foil be up to $200\mu$, especially up to $150\mu$.

From the viewpoints of the gas barrier property, the compression resistance and the resistance to falling shocks, it is important that the scores formed on the metal foil should remain in the midway of the thickness direction of the metal foil. When the easy-open property is taken into account together with the above characteristics, it is preferred that the depth of the scores be 3/10 to 7/10, especially 2/5 to 3/5, of the thickness of the metal foil and that the thickness of the scored portion of the metal foil be at least $20\mu$, especially at least $30\mu$.

The so-prepared laminate is press-formed (draw-formed) and punched, and treatments necessary for forming a lid, such as formation of a peripheral curl portion and draw-forming of a panel portion. Then, scores are formed on the metal foil. Then, an opening tab is attached to the top face of the lid by bonding or the like. Thus, an easily-openable seal lid according to the present invention is formed.

Figure 4:
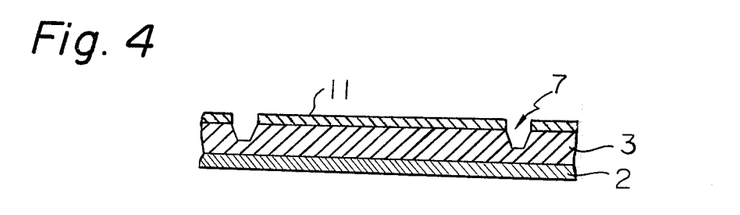
FIG. 4 is an enlarged sectional view illustrating another embodiment of the heat seal lid according to the present invention.

The easily-openable seal lid of the present invention has a multi-layer structure including at least three layers. Referring to FIG. 4 illustrating this embodiment, a resin protecting layer 11 may be formed on the outer face of a metal foil 3. As the resin protecting layer 11, there may be used a high-tenacity plastic film such as a biaxially stretched polyester film, a biaxially stretched polypropylene film or a biaxially stretched nylon film, or a coating layer of an epoxy-phenolic paint, an epoxy-urea paint, an epoxy-melamine paint, a vinyl paint, an acrylic paint or an epoxy-acrylic paint. When a plastic film is used as the resin protecting layer 11, it is necessary that the resin protecting layer 11 should be completely cut at the position of scores as shown in FIG. 4. However, in the case where a coating is used as the resin protecting layer 11, even if the scores 7 are covered with the coating, any particular disadvantage is not brought about.

The lid of the present invention is advantageously used as a heat seal lid for sealing optional vessels, for example, a metal can, a wide-mouthed bottle, a plastic cup, a metal foil vessel, a metal foil/plastics composite vessel and a paper/plastics/aluminum foil composite vessel. The lid of the present invention is especially advantageously used for sealing easily buckling vessels in which double seaming is impossible and packaging vessels which should be subjected to hot packing and heat sterilization.

Incidentally, the shape of the scores is not limited to a circular, square or rectangular shape for opening the entire inside of the seal portion, but there may be adopted a method in which scores are formed in a shape of a small circle or water drop only on a part of the inside of the seal portion. In this case, opening is effected from this small circular or rain drop-like scored part.

A most preferred example of the vessel to which the lid of the present invention is applied is a paper vessel comprising a paper substrate, an aluminum foil and film layers of a polyolefin, especially an ethylene resin formed on both the inner and outer surfaces, for example, a composite can or a composite cup-like vessel. This preferred embodiment is illustrated in FIGS. 5, 6 and 7.

Figure 5:
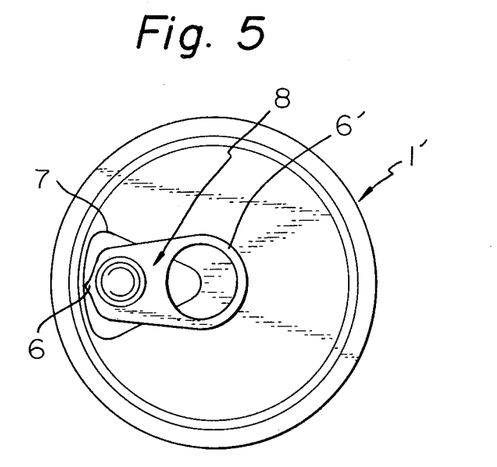
FIG. 5 is a plan view showing still another embodiment of the heat seal lid according to the present invention, in which the score arrangement is different from those in the foregoing embodiments.
Figures 6, 7:
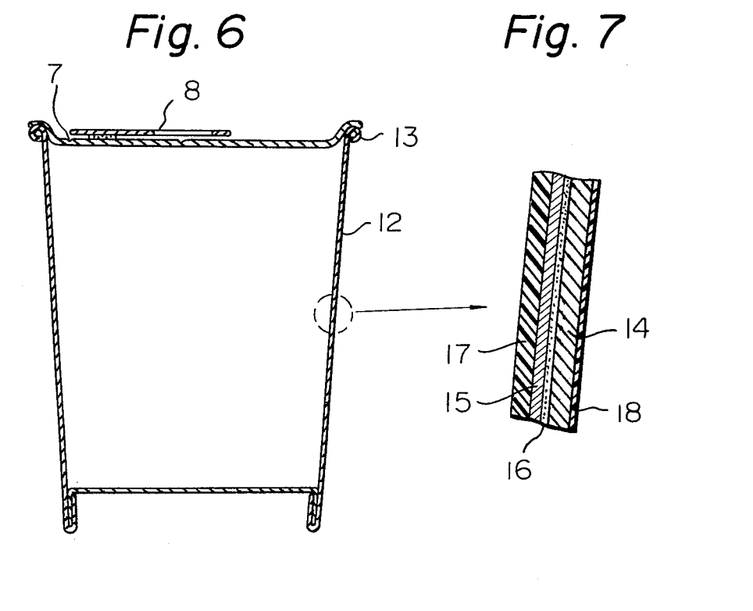
FIG. 6 is a sectional view showing the state where the heat seal lid shown in FIG. 5 is used for sealing a vessel.
FIG. 7 is an enlarged partial sectional view of the vessel shown in FIG. 6.

Referring to FIGS. 5, 6 and 7, a content is hot- or cold-packed in a vessel proper 12, and if necessary, the inside atmosphere is replaced by steam or nitrogen. Then, a lid 1' is placed on the vessel proper 12 so that a flange 13 confronts an olefin resin film layer 2 of the lid, and the flange portion is heated under compression to effect heat sealing. The heating temperature is higher than the melting point of the film layer 2, and the pressure is ordinarily 1 to 10 Kg/cm² gauge. This heat sealing operation can easily be accomplished by known heat sealing means such as a heat seal bar or high frequency induction heater.

The vessel proper 12 of this embodiment, as shown in FIG. 7 in an enlarged manner, comprises a laminate including a paper substrate 14 and an aluminum foil 15 which are bonded together through a polyolefin layer 16 having a polyolefin inner face member 17 on the inner surface and a polyolefin outer face member 18 on the outer surface, and good heat seal can be attained between this vessel proper and the lid of the present invention.

Furthermore, the lid of the present invention can advantageously be used as a heat seal lid for a plastics cup obtained by vacuum forming, a monoaxially or biaxially stretched plastics cup obtained by air pressure forming or a metal foil vessel formed by draw forming. This embodiment is illustrated in FIG. 8.

Figure 8:
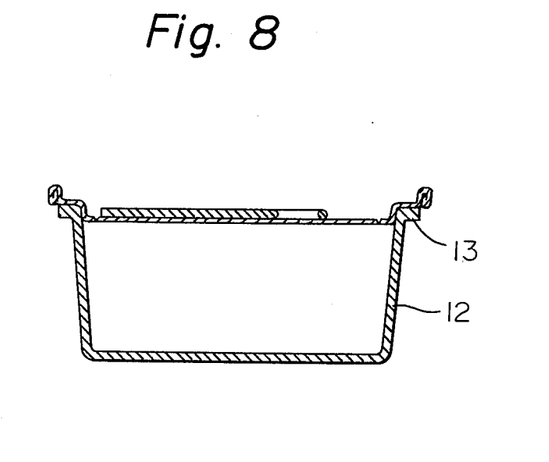
FIG. 8 is a sectional view showing the state where the heat seal lid according to the present invention is used for sealing another vessel.

Referring to FIG. 8, a content is hot- or cold-packed in a plastic vessel proper 12 composed of, for example, polypropylene, and the inner atmosphere is replaced by steam or nitrogen if desired. Then, the lid 1 is placed on the vessel proper 12 so that a flange 13 confronts a propylene resin film layer 2 of the lid, and the flange portion is heated under pressure to effect heat sealing. The heating temperature is higher than the melting point of the film layer 2, and the pressure is ordinarily 1 to 10 Kg/cm² gauge. This heat sealing operation can easily be accomplished by known heat sealing means such as a heat seal bar or high frequency induction heater.

The heat seal portion formed by using the lid of the present invention can fully resist a sterilization treatment such as hot packing, hot water sterilization or retort sterilization, and a high seal reliability can be maintained. Accordingly, a packed food can be stored stably for a long time, and opening can be performed very easily and assuredly. Therefore, great advantages can be attained according to the present invention.

Excellent effects of the present invention will now be described in detail with reference to the following Examples that by no means limit the scope of the invention.

EXAMPLE 1

Maleic anhydride-grafted polypropylene having an average carboxyl group concentration of 180 mes/100 g of the polymer and having a melting point of 161° C. and a melt index of 30 g/10 min was melt-extruded between a soft aluminum foil having the outer face coated with an epoxy-phenolic resin and a thickness of 100μ and a film composed of an ethylene/propylene block copolymer having a melting point of 159°, a density of 0.90 g/cm², a melt index of 7.0 g/10 min and an ethylene content of 4 mole %, which film had a thickness of 50μ, a tear strength of 0.3 Kg (JIS K-6772) and a tensile modulus of 13800 Kg/cm² (ASTM D-638), from a T-die having a width of 650 mm through an extruder having a screw having a diameter of 65 mm at a resin temperature of 250° C. in the die portion. The resulting laminate was pressed by a pair of rolls having diameters of 400 mm and 200 mm, respectively, which were maintained at normal temperature to effect temporary bonding. Then, the laminate was heat-pressed between a heat-treating roll having a diameter of 400 mm and maintained at 200° C. and a silicone roll having a diameter of 200 mm. Then, the laminate was cooled by a chill roll having a diameter of 400 mm and a silicone roll having a diameter of 200 mm to obtain a laminate having a structure of epoxy-phenolic paint/100μ-aluminum foil/10μ-modified polypropylene layer/50μ-ethylene-propylene copolymer layer. The adhesion strength between the aluminum foil and the ethylene-propylene copolymer layer was 1400 g/15 mm.

Separately, a film having a thickness of 10μ was prepared from the same modified polypropylene as described above, and the tear strength was measured. It was found that the tear strength was 0.01 Kg. The tensile modulus of the film was 14700 Kg/cm².

A lid having a shape as shown in FIG. 1 was prepared by subjecting the laminate to punching, forming, scoring and tab-attaching operations. Then, 80 cc of water was packed in a multi-layer plastic cup of a conical shape having a mouth inner diameter of 65 mm, a depth of 30 mm, a flange width of 3 mm and a flange thickness of 0.8 mm, which was formed by the solid phase air pressure forming method, and the above-mentioned lid was placed on the cup and sealing was effected by high frequency induction heating. The multi-layer plastic vessel had a structure of B/B'/C/A/C/B'/B from the outside. A designates a saponified ethylene-vinyl acetate copolymer having an ethylene content of 30 mole % and a saponification degree of 99.2%, B represents isotactic polypropylene having a melt index of 1.4 g/10 min (ASTM D-1238) and a density of 0.91 g/cc (ASTM D-1505), C designates maleic anhydride-modified polypropylene, and B' designates a mixture containing A, B and C at a weight ratio of 5/93/2.

When the so-prepared sealed vessel was heat-sealed at 120° C. for 30 minutes, no disorder or trouble was observed in the vessel. When the opening portion of the lid was opened by utilizing the tab, opening could be accomplished smoothly along a predetermined score line. The initial opening force was 1.2 Kg and the maximum opening force 2.1 Kg. The opening portion after the opening operation was free of such defects as delamination and feathering.

COMPARATIVE EXAMPLE 1

The same soft aluminum foil having a thickness of 100μ as used in Example 1 was laminated with the same ethylene-propylene block copolymer film having a thickness of 50μ as used in Example 1 by using an isocyanate type adhesive. The adhesion strength between the aluminum foil and the ethylene-propylene copolymer film in the resulting laminate was 700 g/15 mm.

A lid was prepared from this laminate in the same manner as described in Example 1, and the lid was placed on a water-packed multi-layer plastic cup and sealed in the same manner as described in Example 1. The packed cup was heat-sterilized at 120° C. for 30 minutes. After the heat sterilization, the opening portion of the lid was opened. While breaking was advanced along the scores, delamination was caused in the bonding interface between the aluminum foil and the polypropylene layer. Therefore, continuation of smooth breaking along the scores became impossible and the appearance after the opening operation was extremely bad and withdrawal of the content was apparently hindered.

EXAMPLE 2

A laminate having the same structure as in Example 1 was prepared in the same manner as described in Example 1 except that a blend comprising 60% by weight of maleic anhydride-grafted polypropylene having an average carboxyl group concentration of 240 meq/100 g of the polymer, a melting point of 163° C. and a melt index of 25 g/10 min, 30% by weight of an ethylene-propylene random copolymer having a melting point of 158° C., a density of 0.90 g/cm$^3$, a melt index of 30 g/10 min and an ethylene content of 3 mole % and 10% by weight of low-density polyethylene having a melting point of 110° C., a density of 0.928 g/cm$^3$ and a melt index of 10 g/10 min was used as the thermoplastic resin adhesive. The adhesion strength was 1450 g/15 mm. A lid was prepared from this laminate and the test was carried out in the same manner as described in Example 1. The openability was very good.

EXAMPLES 3 THROUGH 6

Laminate sheets having a structure as shown in Table 1 were prepared from materials shown in Table 1. In Examples 3 through 5, temporarily bonded laminates were prepared according to the two-layer co-extrusion coating method, and in Example 6, a temporarily bonded laminate was prepared according to the sandwich lamination method. The temporarily bonded laminates were heat-treated in the same manner as described in Example 1 to obtain these laminate sheets.

In Examples 3 and 4, lids having a shape shown in FIG. 5 were prepared from the laminates by punching, forming, scoring and tab-attaching operations. Then, orange juice was hot packed in a composite vessel composed of a paper-aluminum foil-polyethylene laminate, which had a diameter of 54 mm and had a tapered side wall having a height of 85 mm and an opening portion having an opening end formed into a curly shape and a diameter of 70 mm, and the lid was sealed to the curly end of the opening of the cup.

In Examples 5 and 6, full-open type lids as shown in FIG. 1 were prepared. Refined sake was packed in a composite vessel shown in FIG. 6, and the lid was sealed to the vessel.

When these vessels were opened by pulling up opening tabs formed on the lids, in each vessel, opening could be accomplished smoothly along the predetermined score line, and the opening portion after the opening operation was free of delamination and feathering and was in a good state.

COMPARATIVE EXAMPLE 2

An isocyanate type anchoring agent was coated on the same soft aluminum foil having a thickness of 100μ as used in Example 3, and the same medium density polyethylene as used in Example 3 was coated on the coated surface of the aluminum foil according to the customary melt extrusion method to obtain a laminate having a structure of 100μ-aluminum foil/isocyanate anchoring agent layer/30μ-medium density polyethylene layer. The adhesion strength between the aluminum foil and the medium density polyethylene layer in this laminate was 600 g/10 mm.

A lid was prepared from this laminate in the same manner as described in Example 3 and was heat-sealed to a composite cup packed with orange juice in the same manner as described in Example 3. When the opening portion of the lid along scores, delamination was caused in the bonding interface between the aluminum foil and the medium density polyethylene during the cutting operation and the appearance of the opening portion after the opening operation was very bad.

COMPARATIVE EXAMPLE 3

A lid was prepared in the same manner as described in Example 4 except that an ethylene/vinyl acetate copolymer having a vinyl acetate content of 26% by weight, a melt index of 5 g/10 min, a melting point of 95° C., a thickness of 30μ, a tear strength of 0.3 Kg and a tensile modulus of 160 Kg/cm$^2$ was used instead of the medium density polyethylene for the inner face resin layer, and the opening test of the lid was carried out in the same manner as described in Example 4. Since the ethylene-vinyl acetate copolymer of the inner face layer was elongated, opening was difficult.

COMPARATIVE EXAMPLE 4

A lid was prepared in the same manner as described in Example 6 except that low density polyethylene having a thickness of 100μ, a tear strength of 3.2 Kg, a tensile modulus of 1200 Kg/cm$^2$, a melt index of 0.9 g/10 min and a melting point of 110° C. was used as the inner face resin layer. When this lid was subjected to the opening test, the inner face low density polyethylene layer could not be broken along scores and opening was very difficult.

EXAMPLE 7

The same maleic anhydride-modified polypropylene as used in Example 1, in which PHR of aluminum hydroxide was melt-blended, was used as the material of the adhesive layer, and a blend comprising 93% by weight of an ethylene-propylene random copolymer having a melting point of 158° C., a density of 0.90 g/cm$^3$, a melt index of 25 g/10 min and an ethylene content of 7 mole % and low density polyethylene having a melting point of 110° C., a density of 0.920 g/cm$^3$ and a melt index of 10 g/10 min was used as the material of the inner face resin layer. These two resins were temporarily laminated on an uncoated surface of a soft aluminum foil having a thickness of 100μ and an outer surface coated with an epoxy-phenolic paint according to the two-layer co-extrusion coating method. The temporarily bonded laminate was heat-treated in the same manner as described in Example 1 to obtain a laminate having a structure of epoxy-phenolic paint/100μ-aluminum foil/10μ-modified polypropylene layer/40μ-polyethylene-propylene blend layer. The adhesion strength between the aluminum foil and the modified polypropylene layer in this laminate was 1800 g/15 mm.

Separately, a film having a thickness of 10μ was prepared from the above-mentioned modified polypropylene used for the laminate, and the tear strength of the film was measured. It was found that the tear strength was 0.01 Kg. The tensile modulus was 14800 Kg/cm². Furthermore, a film having a thickness of 40μ was prepared from the above-mentioned ethylene-propylene random copolymer/low density polyethylene blend. The tear strength was 0.1 Kg and the tensile modulus was 11600 Kg/cm².

The above-mentioned laminate was subjected to punching, forming, scoring and tab-attaching operations and a lid similar to that obtained in Example 1 was prepared.

A laminate comprising a soft aluminum foil having an outer face coated with an epoxy-phenolic resin and a thickness of 120μ and an ethylene-propylene block copolymer having a thickness of 70μ as the inner face material was formed on a frustoconical cup provided with a top end-curled flange portion having a width of 3 mm, which had a mouth diameter of 65 mm and a depth of 30 mm. The resulting cup was packed with potato salad, and the above-mentioned lid was placed on the cup and heatsealed thereto by a high frequency induction heating sealer.

When the so-prepared sealed vessel was subjected to retort sterilization at 120° C. for 30 minutes, no disorder or trouble was observed. When the vessel was opened in the opening portion of the lid by utilizing the tab, opening could be accomplished smoothly along the predetermined score line. The initial opening force was 1.0 Kg and the maximum opening force was 1.9 Kg. Delamination or feathering was not caused at all.

EXAMPLES 8 THROUGH 10

A thermoplastic resin heat-bondable to a metal, as shown in Table 2, was heat-bonded as the inner face resin layer to a soft aluminum foil having an outer surface coated with an epoxy-phenolic paint and a thickness of 100μ, according to a method shown in Table 2, and the assembly was cooled by chill rolls to obtain a laminate.

A lid having a shape shown in FIG. 1 was prepared by subjecting the laminate to punching, forming, scoring and tab-attaching operations.

Then, 80 cc of water was packed in a formed cup similar to that obtained in Example 7, which comprised a soft aluminum foil having an outer face coated with an epoxy-phenolic paint and a thickness of 120μ, and the lid was placed on the cup and sealed by a high frequency sealer.

In Examples 8 and 9, the obtained sealed cups were subjected to retort sterilization at 145° C. for 10 minutes, and in Example 10, the sealed cup was subjected to retort sterilization at 120° C. for 30 minutes. In each cup, no disorder or trouble was observed. When the sealed cups were opened in the opening portions of the lids by utilizing the tabs, in each case, opening could be performed smoothly along the predetermined score line. The initial opening forces and maximum opening forces were as shown in Table 2. In each case, the opening portion after the opening operation was free of delamination or feathering and had a good appearance.

COMPARATIVE EXAMPLE 5

Procedures of Example 9 were repeated in the same manner except that an aluminum foil having an outer face coated with an epoxy-phenolic paint, on an uncoated inner face of which a nylon 12/nylon 6 was heat-bonded, was used as the aluminum foil. The adhesion strength of the laminate was as low as 600 g/15 mm. This adhesion strength was further reduced by retort sterilization, and when the vessel was opened by utilizing the tab, delamination was caused.

EXAMPLES 11 THROUGH 13

A thermoplastic resin inner face member shown in Table 3 was heat-bonded to a soft aluminum foil having an outer face coated with an epoxy-phenolic resin and a thickness of 100μ through a thermoplastic resin adhesive shown in Table 3 according to a method shown in Table 3. The laminate was cooled by chill rolls, and a lid was prepared from this laminate in the same manner as described in Example 1.

Then, 80 cc of water was packed in a formed cup similar to that obtained in Example 7, which was composed of a laminate comprising a soft aluminum foil having an outer face coated with an epoxy-phenolic paint and a thermoplastic resin inner face member shown in Table 3, and the lid was placed on the cup and sealed thereto by a high frequency induction heating sealer.

In Example 11, the sealed vessel was subjected to retort sterilization at 145° C. for 10 minutes, and in Examples 12 and 13, the sealed vessels were subjected to retort sterilization at 120° C. for 30 minutes. In each case, no disorder or trouble was observed. When these vessels were opened in the opening portions by utilizing the tabs, in each case, opening could be accomplished smoothly along the score line. The initial opening forces and maximum opening forces were as shown in Table 3. In each case, the opening portion after the opening operation was free of delamination or feathering and had a good appearance.

The foregoing Examples are summarized in Tables 1 through 3.

TABLE 1

| Example No. | Material | Adhesive Layer Thickness (μ) | FAe-Ad (g/15mm) | TAd (Kg) | EAd (Kg/cm²) |
|---|---|---|---|---|---|
| 3 | maleic anhydride-modified linear low density polyethylene (MI = 2.7, density = 0.920) | 8 | 1400 | 0.02 | 1,800 |
| 4 | maleic anhydride-modified ethylene-vinyl acetate copolymer (vinyl acetate content = 5 wt %, MI = 4, m.p. = 105° C.) | 5 | 1200 | 0.01 | 1,150 |

TABLE 1-continued

| | | | | | |
|---|---|---|---|---|---|
| 5 | maleic anhydride-modified high density polyethylene (MI = 24, density = 0.953, m.p. = 132° C.) | 5 | 1050 | 0.01 | 9,800 |
| 6 | maleic anhydride-modified high density polyethylene (MI = 24, density = 0.953, m.p. = 132° C.), 1 wt % of aluminum hydroxide | 5 | 1350 | 0.01 | 9,900 |

| Example No. | Inner Face Resin Layer | | | | Initial Opening Force (Kg) | Maximum Opening Force (Kg) |
|---|---|---|---|---|---|---|
| | Material | Thickness (μ) | FAd-Fm (g/15mm) | TFm (Kg) | EFm (Kg/cm²) | | |

| Example No. | Material | Thickness (μ) | FAd-Fm (g/15mm) | TFm (Kg) | EFm (Kg/cm²) | Initial Opening Force (Kg) | Maximum Opening Force (Kg) |
|---|---|---|---|---|---|---|---|
| 3 | medium density polyethylene (MI = 15, density = 0.949, m.p. = 128° C.) | 30 | 3500 | 0.3 | 7,400 | 1.1 | 2.0 |
| 4 | medium density polyethylene (MI = 15, density = 0.949, m.p. = 128° C.) | 35 | 3800 | 0.3 | 7,400 | 1.1 | 2.0 |
| 5 | high density polyethylene (MI = 6, density = 0.952, m.p. = 130° C.) | 40 | 5200 | 0.4 | 9,500 | 1.2 | 2.1 |
| 6 | high density polyethylene (MI = 2, density = 0.954, m.p. = 132°C.) | 40 | 4900 | 0.4 | 9,300 | 1.2 | 2.1 |

Note
FAe-Ad (g/15mm): adhesion strength between metal foil and adhesive layer
FAd-Fm (g/15mm): adhesion strength between adhesive layer and inner face resin layer
TAd (Kg): tear strength (JIS K-6772) of adhesive layer
TFm (Kg): tear strength (JIS K-6772) of adhesive layer
EAd (Kg/cm²): tensile modulus (ASTM D-638) of adhesive layer
EFm (Kg/cm²): tensile modulus (ASTM D-638) of adhesive layer

TABLE 2

| Example No. | Material for Treatment of Inner Face of Aluminum Foil | Material | Heat-Bondable Thermoplastic Resin Inner Face Layer | | | |
|---|---|---|---|---|---|---|
| | | | Thickness (μ) | F (g/15mm) | T (Kg) | E (Kg/cm²) |
| 8 | epoxy-phenolic paint | 20 wt % of polyethylene terephthalate, 40 wt % of polyethylene terephthalate/isophthalate, 40 wt % of polybutylene terephthalate/isophthalate | 50 | 1150 | 0.3 | 4100 |
| 9 | epoxy-phenolic paint | nylon 12/nylon 6 copolymer | 40 | 950 | 0.4 | 12000 |
| 10 | not treated | maleic anhydride-modified polypropylene (average carbonyl group concentration = 120 meq/100 g polymer, m.p. = 162° C. MI = 7.0 g/10 min, density = 0.90 g/cc) | 40 | 1250 | 0.5 | 14500 |

| Example No. | Inner Face Resin Layer of Formed Cup | | Initial Opening Force (Kg) | Maximum Opening Force (Kg) | Lamination Method |
|---|---|---|---|---|---|
| | Material | Thickness (μ) | | | |
| 8 | 20 wt % of polyethylene terephthalate, 40 wt % of polyethylene terephthalate/isophthalate, 40 wt % of polybutylene terephthalate/isophthalate | 50 | 1.1 | 2.0 | heat-lamination |
| 9 | nylon 12 | 30 | 1.1 | 2.1 | heat lamination |
| 10 | ethylene-propylene block copolymer (MI = 9.0 g/10 min, m.p. = 157° C., density = 0.90 g/cc) | 70 | 1.2 | 2.2 | heat lamination |

Note
F (g/15mm): adhesion strength between metal foil and heat-bondable thermoplastic resin inner face layer
T (Kg): tear strength (JIS K-6772) of heat-bondable thermoplastic inner face layer
E (Kg/cm²): tensile modulus (ASTM D-638) of heat-bondable thermoplastic inner face layer

TABLE 3

| Example No. | Material for Treatment of Inner Face of Aluminum Foil | Material | Adhesive Layer Thickness ($\mu$) | FAe-Ad (g/15mm) | TAd (Kg) | EAd (Kg/cm$^2$) |
|---|---|---|---|---|---|---|
| 11 | epoxy-phenolic paint | 20 wt % of polyethylene terephthalate, 30 wt % of polyethylene terephthalate/isophthalate, 35 wt % of polybutylene terephthalate/isophthalate, 15 wt % of Surlyn ® | 20 | 1100 | 0.1 | 3900 |
| 12 | epoxy-phenolic paint | polyethylene terephthalate/isophthalate (m.p. = 165° C.) | 10 | 900 | 0.1 | 3800 |
| 13 | epoxy-phenolic paint | 50 wt % of polyethylene terephthalate/isophthalate, 50 wt % of polybutylene terephthalate | 10 | 1000 | 0.1 | 3700 |

| Example No. | Material | Inner Face Resin Layer Thickness ($\mu$) | FAd-Fm (g/15mm) | TFm (Kg) | EFm (Kg/cm$^2$) | Lamination Method |
|---|---|---|---|---|---|---|
| 11 | 40 wt % of polyethylene terephthalate/isophthalate, 60 wt % of polybutylene terephthalate/isophthalate | 40 | 1500 | 0.2 | 4700 | heat lamination of two-layer co-extruded film |
| 12 | ethylene glycol/cyclohexyl dimethyl alcohol terephthalate copolymer | 30 | 1700 | 0.2 | 3600 | lamination of two-layer co-extruded film and post heat treatment |
| 13 | ethylene glycol/1,4-butane diol/neopentyl glycol/terephthalate/sebacate copolymer | 30 | 1600 | 0.2 | 2800 | lamination of two-layer co-extruded film and post heat treatment |

| Example No. | Inner Face Resin Layer of Formed Cup Material | Thickness ($\mu$) | Initial Opening Force (Kg) | Maximum Opening Force (Kg) |
|---|---|---|---|---|
| 11 | polyethylene terephthalate/isophthalate (m.p = 165° C.) | 50 | 1.1 | 2.0 |
| 12 | ethylene glycol/cyclohexyl dibutyl alcohol terephthalate copolymer | 40 | 0.8 | 1.9 |
| 13 | polyethylene terephthalate | 20 | 1.0 | 2.0 |

Note
FAe-Ad (g/15mm): adhesive strength between metal foil and adhesive layer
FAd-Fm (g/15mm): adhesive strength between adhesive layer and inner face resin layer
TAd (Kg): tear strength (JIS K-6772) of adhesive layer
TFm (Kg): tear strength (JIS K-6772) of inner face resin layer
EAd (Kg/cm$^2$): tensile modulus (ASTM D-638) of adhesive layer
EFm (Kg/cm$^2$): tensile modulus (ASTM D-638) of adhesive layer

What we claim is:

1. An easily openable heat seal lid for sealing a vessel proper by forming a heat-sealed portion between the lid and the vessel proper, which comprises a laminate comprising at least an inner face member composed of a thermoplastic resin and a metal foil, wherein scores defining a portion to be opened are formed on the side inner than the portion to be heat-sealed so that the scores extend to the midway of the thickness direction of the metal foil, and said inner face member comprises at least one heat-selable thermoplastic resin layer having an adhesion strength of at least 800 g/15 mm to the metal foil, a tear strength lower than 3.0 Kg and a tensile modulus of at least 300 Kg/cm$^2$.

2. A lid as set forth in claim 1, wherein the metal foil has a thickness of 50 to 150 microns and scores are formed in the metal foil in a depth of 3/10 to 7/10 of the metal foil thickness so that the thickness of the remaining metal foil in the scored portion is at least 20 microns.

3. A lid as set forth in claim 1, wherein the heat-sealable thermoplastic resin layer is a resin film having a heat-bondability to the metal foil.

4. A lid as set forth in claim 1, wherein the heat-sealable thermoplastic resin layer is composed of a thermoplastic resin containing carbonyl groups derived from a carboxylic acid, carboxylic acid anhydride, carboxylic acid salt, ester, amide, urea or urethane at a concentration of 1 to 1400 meq/100 g of the polymer in the main chain or side chain.

5. A lid as set forth in claim 1, wherein the heat-sealable thermoplastic resin layer is composed mainly of a homopolyester, a copolyester, a homopolyamide, a copolyamide or an acid-modified olefin resin.

6. A lid as set forth in claim 1, wherein the heat-sealable thermoplastic resin layer consists of a combination of (a) a layer composed of a crystalline olefin resin formed mainly of propylene or a crystalline olefin resin having a melt index of 1 to 40 g/10 min and being formed mainly of ethylene and (b) a layer of an acid- or acid anhydride-modified olefin resin having the same main constituent monomer as that of the inner face member resin, said layer (a) being heat-bonded to the metal foil through said layer (b).

7. A lid as set forth in claim 6, wherein the acid-modified olefin resin contains a carboxyl group or its anhydride at a concentration of 10 to 300 meq/100 g of the polymer and has a melt index of at least 5 g/10 min.

8. A lid as set forth in claim 6, wherein the propylene resin has a melt index (ASTM D-1238) of 1 to 100 g/10 min and a density of at least 0.885 g/cc.

9. A lid as set forth in claim 6, wherein the ethylene resin is polyethylene having a density of at least 0.945 g/cc and the total thickness of the inner face member and the acid-modified resin layer is up to 70 microns.

10. A lid as set forth in claim 1, which further comprises a resin protecting layer bonded to the outer side of the metal foil, said resin protecting layer being completely cut at the position of the scores.

11. An easily openable heat seal lid for sealing a vessel proper by forming a heat-sealed portion between the lid and the vessel proper, which comprises a laminate comprising at least an inner face member composed of a propylene resin and a metal foil, wherein scores defining a portion to be opened are formed on the side inner than the portion to be heat-sealed so that the scores extend to the midway of the thickness direction of the metal foil, the olefin resin inner face member is heat-bonded to the metal foil through an acid- or acid anhydride-modified olefin resin comprising propylene as the main constituent olefin monomer, said inner face member is composed of crystalline polypropylene having a melt index (ASTM D-1238) of 1 to 100 g/10 min, a density of at least 0.885 g/cc and a spherulite size of at least 5 microns as determined according to the light scattering method or a crystalline propylene-ethylene copolymer having an ethylene content of up to 15 mole %, the acid-modified olefin resin contains a carboxyl group or its anhydride at a concentration of 10 to 300 meq/100 g of the polymer and has a melt index of at least 3 g/10 min, the metal foil has a thickness of 50 to 100 microns, scores are formed in the metal foil in a depth of 3/10 to 7/10 of the thickness of the metal foil so that the thickness of the remaining metal layer in the scored portion is at least 20 microns, and the inner face member and the acid-modified olefin resin layer have a thickness of 30 to 100 microns and a thickness of 0.5 to 20 microns, respectively.

12. An easily openable heat seal lid for sealing a vessel proper by forming a heat-sealed portion between the lid and the vessel proper, which comprises a laminate comprising at least an inner face member of an olefin resin containing ethylene as the main constitutent monomer and a metal foil, wherein scores defining a portion to be opened are formed on the side inner than the portion to be heat-sealed so that the scores extend to the midway of the thickness direction of the metal foil, the olefin resin inner member is heat-bonded to the metal foil through an acid- or acid anhydride-modified olefin resin comprising ethylene as the main constituent monomer, said inner face member is composed of polyethylene having a melt index (ASTM D-1238) of 1 to 40 g/10 min and a density of at least 0.945 g/cc, the acid-modified olefin resin contains a carboxyl group or its anhydride at a concentration of 10 to 300 meq/100 g of the polymer and has a melt index of at least 5 g/10 min, said metal foil has a thickness of 50 to 150 microns, scores are formed in the metal foil in a depth of 3/10 to 7/10 of the thickness of the metal foil so that the thickness of the remaining metal foil in the scored portion is at least 20 microns, and the entire thickness of the inner face member and the acid-modified olefin resin is up to 70 microns.

* * * * *